United States Patent
Friedrich et al.

(10) Patent No.: US 9,418,766 B2
(45) Date of Patent: Aug. 16, 2016

(54) FUEL ASSEMBLY FOR A BOILING WATER REACTOR

(75) Inventors: Erhard Friedrich, Eckental (DE); Hans-Joachim Lippert, Höchstadt (DE); Roland Rink, Erlangen (DE)

(73) Assignee: Areva GmbH, Erlanger (DE)

(*) Notice: Subject to any disclaimer, the term of this patent is extended or adjusted under 35 U.S.C. 154(b) by 969 days.

(21) Appl. No.: 11/811,439

(22) Filed: Jun. 8, 2007

(65) Prior Publication Data

US 2008/0101528 A1 May 1, 2008

Related U.S. Application Data

(63) Continuation of application No. PCT/EP2005/011862, filed on Nov. 5, 2005.

(30) Foreign Application Priority Data

Dec. 9, 2004 (DE) .......................... 10 2004 059 195

(51) Int. Cl.
*G21C 3/04* (2006.01)
*G21C 3/33* (2006.01)
*G21C 5/06* (2006.01)

(52) U.S. Cl.
CPC .............. *G21C 3/3305* (2013.01); *G21C 5/06* (2013.01); *G21Y 2002/302* (2013.01); *G21Y 2004/301* (2013.01); *Y02E 30/40* (2013.01)

(58) Field of Classification Search
USPC ................................................. 376/261, 453
See application file for complete search history.

(56) References Cited

U.S. PATENT DOCUMENTS

| | | | | |
|---|---|---|---|---|
| 3,951,739 A | * | 4/1976 | Frick et al. | 376/437 |
| 3,968,008 A | * | 7/1976 | Piepers et al. | 376/446 |
| 4,152,206 A | | 5/1979 | Jabsen | |
| 5,361,287 A | * | 11/1994 | Williamson | 376/352 |
| 5,481,578 A | * | 1/1996 | Matzner | 376/352 |
| 5,490,191 A | * | 2/1996 | Christiansen et al. | 376/434 |
| 5,519,745 A | * | 5/1996 | Proebstle et al. | 376/313 |
| 5,859,888 A | * | 1/1999 | Elkins et al. | 376/443 |
| 6,690,758 B1 | * | 2/2004 | Elkins | 376/313 |
| 2003/0128798 A1 | * | 7/2003 | Kageyama et al. | 376/310 |

FOREIGN PATENT DOCUMENTS

| | | |
|---|---|---|
| AT | 365 828 | 2/1982 |
| DE | 2 215 134 A1 | 10/1972 |
| DE | 41 14 004 A1 | 11/1992 |
| DE | 201 05 913 U1 | 7/2001 |
| JP | 2151793 A | 6/1990 |
| JP | 2002156482 A | 5/2002 |
| WO | 03067606 A2 | 8/2003 |

* cited by examiner

*Primary Examiner* — Sean P Burke
(74) *Attorney, Agent, or Firm* — Laurence A. Greenberg; Werner H. Stemer; Ralph E. Locher (57) ABSTRACT

A fuel assembly of a boiling water reactor contains a fuel assembly base closed at the top by a filter plate, a fuel assembly head, and, disposed between them, a bundle of long and medium-length fuel rods extending away from the fuel assembly base. A water channel is disposed inside the fuel rod bundle. A plurality of the medium-length fuel rods are fixed axially on a separate holding part which is connected to the upper side of the fuel assembly base.

16 Claims, 10 Drawing Sheets

FUEL ASSEMBLY FOR A BOILING WATER REACTOR

CROSS-REFERENCE TO RELATED APPLICATION

This is a continuation application, under 35 U.S.C. §120, of copending international application PCT/EP2005/011862, filed Nov. 5, 2005, which designated the United States; this application also claims the priority, under 35 U.S.C. §119, of German patent application DE 10 2004 059 195.4, filed Dec. 9, 2004; the prior applications are herewith incorporated by reference in their entirety.

BACKGROUND OF THE INVENTION

Field of the Invention

The invention relates to a fuel assembly for a boiling water reactor. Such a fuel assembly, known for example from German Utility Model DE 201 05 913 U1 and Austrian patent AT 365 828 C, contains a fuel assembly base closed at the top by a filter plate, a fuel assembly head and, disposed between them, a bundle of long and medium-length fuel rods extending away from the fuel assembly base, and a water channel disposed inside the fuel rod bundle. The long fuel rods are held between the fuel assembly base and head with a small axial play. This play allows the fuel rods to expand in a longitudinal direction, without mechanical stresses occurring. The medium-length fuel rods, which extend starting from the fuel assembly base only as far as a position below the fuel assembly head, are used in boiling water reactors substantially for reasons of thermohydraulic stability and neutron moderation. In order to prevent the medium-length fuel rods from floating up during the reactor operation and reaching an unfavorable placement position, they are held on the fuel assembly base. This is conventionally done by incorporating bores, into which a sleeve is welded, in the filter plate (fuel guard) closing the fuel assembly base on the upper side and used to trap foreign bodies in the cooling water. A spring assembly, for instance sleeve-shaped, is fixed at the lower end of medium-length rods and is fitted into the bore provided with a sleeve in the filter plate and held there by a friction-fit or form fit. Producing the pores in the filter plate, soldering in the sleeves and fastening spring assemblies on the lower end of medium-length rods entail relatively high manufacturing and assembly outlay.

SUMMARY OF THE INVENTION

It is accordingly an object of the invention to provide a fuel assembly for a boiling water reactor which overcomes the herein-mentioned disadvantages of the heretofore-known devices of this general type, which provides for a simple fastening of a medium-length fuel rod on a fuel assembly base.

With the foregoing and other objects in view there is provided, in accordance with the invention, a fuel assembly for a boiling water reactor. The fuel assembly contains a filter plate, a fuel assembly base having an upper side with a top and closed at the top by the filter plate, a separate holding part connected to the upper side of the fuel assembly base, a fuel assembly head and a bundle of fuel rods, including long fuel rods and medium-length fuel rods, extending away from the fuel assembly base and disposed between the fuel assembly base and the fuel assembly head. A plurality of the medium-length fuel rods are fixed axially on the separate holding part. A water channel is disposed inside of the bundle of fuel rods.

The object is achieved by a plurality of the medium-length fuel rods being fixed axially on a separate holding part which is connected to the upper side of the fuel assembly base. Introducing bores into the filter plate of a fuel assembly base and soldering in sleeves can be obviated. It is admittedly necessary to produce one or more separate holding parts. These, however, can be configured relatively simply, for example as stamped sheet metal parts, and can then be produced with correspondingly little outlay. Furthermore, a plurality or even all of the medium-length fuel rods can be fixed simultaneously on such a holding part. The holding part can likewise be fastened on the fuel assembly base or on the filter plate in a straightforward way, for example by welding at a few positions.

A further simplification relates in configuring the holding part so that long fuel rods can also be supported thereon, with or without axial fixing. A plurality of medium-length and long fuel rods are thus simultaneously assigned to one holding assembly. For example, a holding assembly may then extend over an entire fuel rod row without this entailing particular requirements for the configuration of the holding assembly. In particular, a single holding assembly may be used for fixing all the fuel rods of a fuel assembly.

A holding part may also be configured so that at least some of the long fuel rods are fixed at least radially thereon. Lateral holding of the long fuel rods thereby takes place in the region of the fuel assembly base, so that the bottom spacer, i.e. the one lying closest to the fuel assembly base, can be obviated. In this context, it may be advantageous for at least some of the medium-length fuel rods also to be fixed radially on a holding part.

A fuel rod is preferably fixed on the holding part with the aid of a snap connection with an axial assembly direction. This simplifies assembly of the fuel rods on the fuel assembly base. A fuel rod merely needs to be fitted axially into a correspondingly configured holding assembly on the holding part, without further fixing measures being necessary. According to a preferred configuration of such a type of connection, the lower end of a fuel rod has a waist behind which a latch assembly disposed on a holding part engages in an axially effective fashion. The latch assembly is preferably formed by two clip assemblies molded onto the holding assembly with their flat sides facing one another, these respectively having a precurved region which engages resiliently into the waist. The mutually opposing clips also retain a fuel rod laterally, so that to this extent there is already some degree of lateral or radial fixing. Lateral displacement could at most take place in a direction extending for instance along the clips. This, however, is prevented in a preferred configuration by two projections protruding laterally at diametrically opposing positions being provided on the lower end of a fuel rod, each of which engages in a recess of a clip.

In order not to further limit the flow cross section for the cooling water flowing through a fuel assembly base, which is already restricted by the filter plate, a holding part is disposed on the filter plate so that its filter openings remain substantially free. In the case of filter plates which contain bars extending mutually parallel, this is ensured by the holding parts being configured as rails which are disposed mutually parallel and with the grid period of the filter plate bars. It is in this case conceivable to use separate rails, i.e. ones which are not connected to one another. In such a case the individual rails are fixed, in particular welded on the grid plate. According to another advantageous configuration, the rails are components of an integral grid plate, and they are molded by their ends onto connecting bars aligned transversely to them. Such a grid plate can be fixed on the fuel assembly base with little assembly outlay. Particularly simple fixing is ensured by the grid plate containing an opening, through which the water channel passes, behind the opening edge of which the water channel engages in an axially effective fashion. Rotational fixing of the holding part, which is necessary in particular whenever the bottom spacer is intended to be obviated, may for instance be carried out by welding the grid plate on the fuel assembly base. Preferably, however, the grid plate is rotationally fixed on the water channel, which may be achieved by a form fit effective in the rotational direction between the water channel and the opening, or its opening edge.

Other features which are considered as characteristic for the invention are set forth in the appended claims.

Although the invention is illustrated and described herein as embodied in a fuel assembly for a boiling water reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
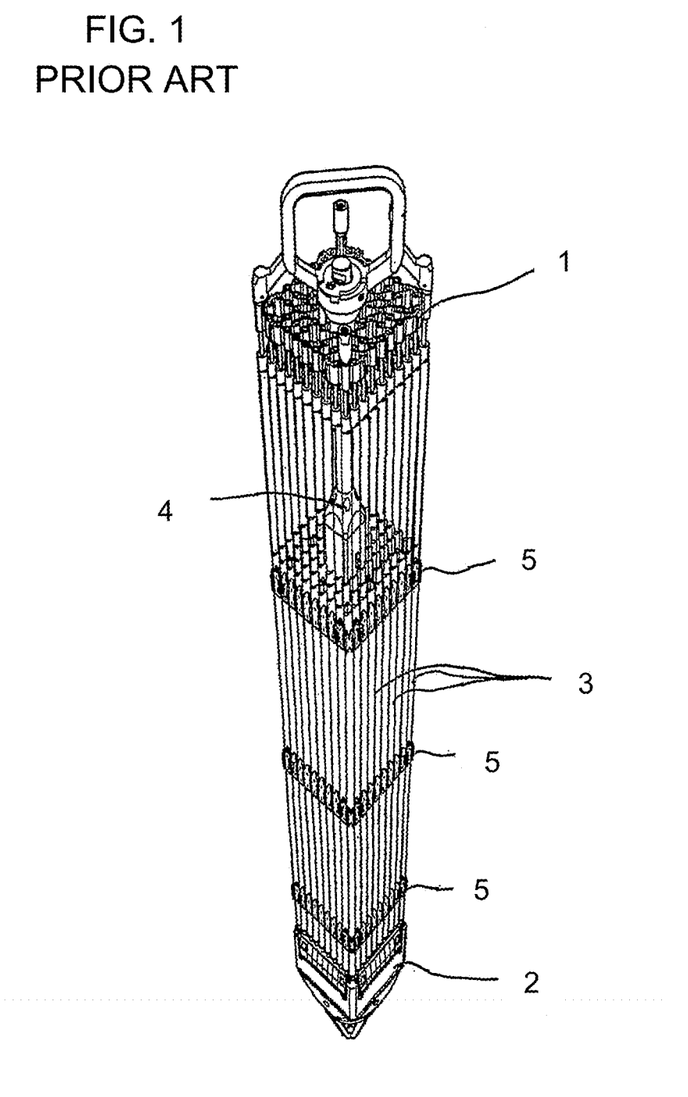
FIG. 1 is a diagrammatic, perspective overall view of a fuel assembly for a boiling water reactor.
Figure 2:
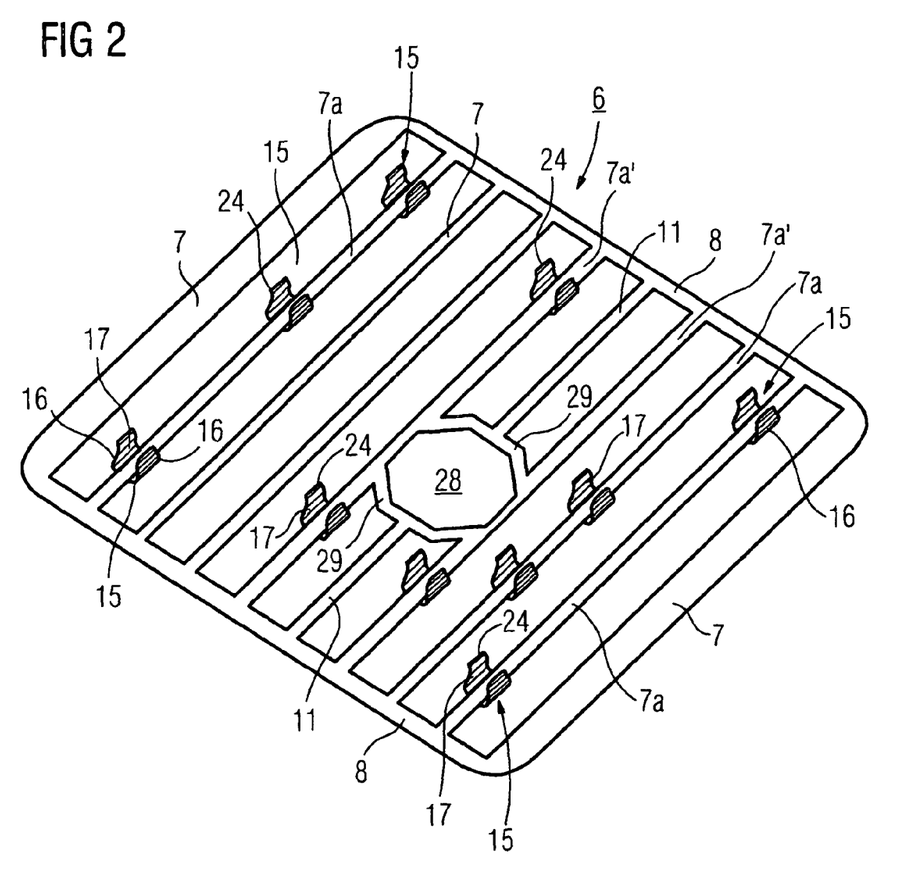
FIG. 2 is a diagrammatic, perspective view of a grid plate formed by a plurality of holding parts with latch assemblies used for fastening only medium-length fuel rods.
Figure 3:
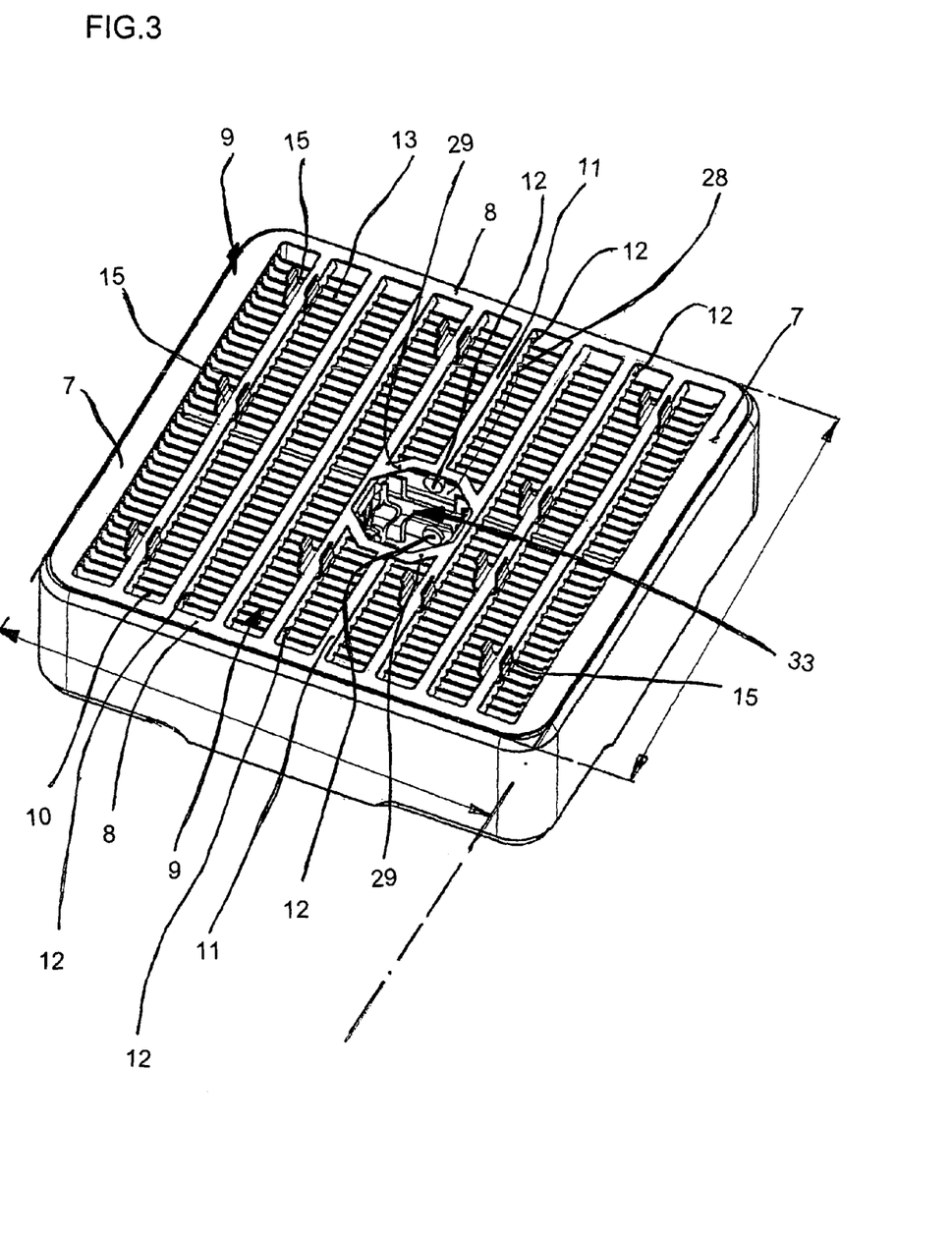
FIG. 3 is a diagrammatic, perspective view of an upper region of a fuel assembly base with a filter plate and the grid plate positioned thereon.
Figure 4:
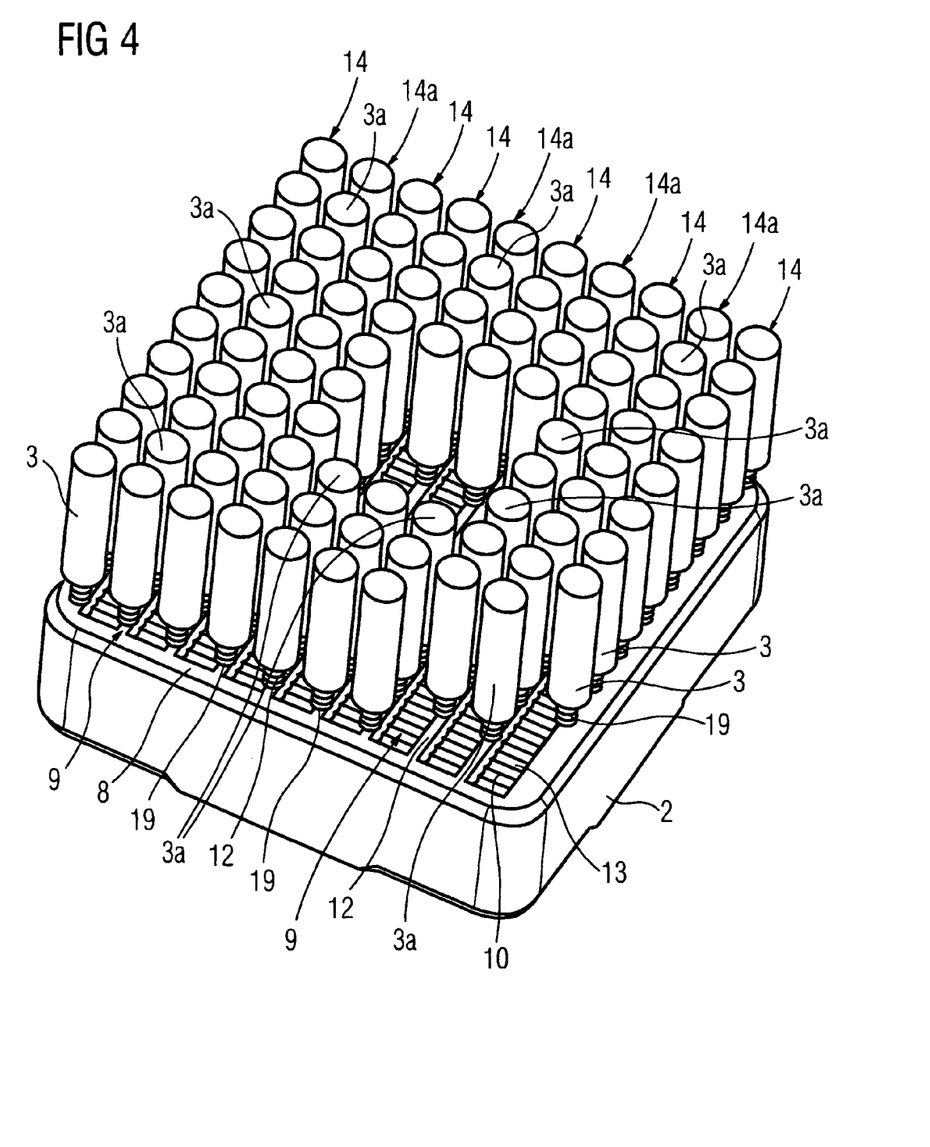
FIG. 4 is a diagrammatic, perspective view of the fuel assembly base of FIG. 3 with long and medium-length fuel rods disposed thereon.
Figure 5:
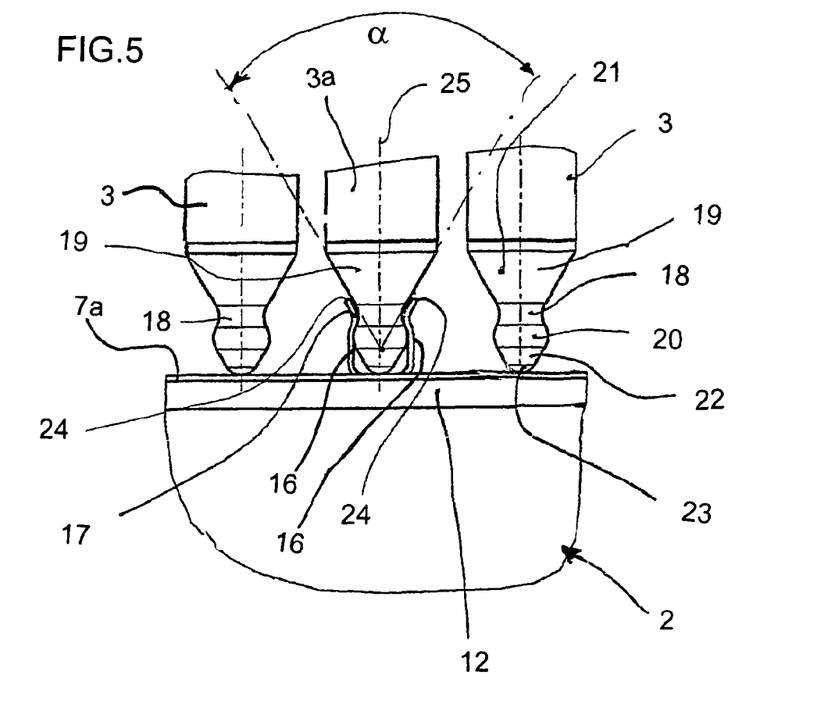
FIG. 5 is a diagrammatic, enlarged side view of a detail of the fuel assembly base shown in FIG. 4.
Figure 6:
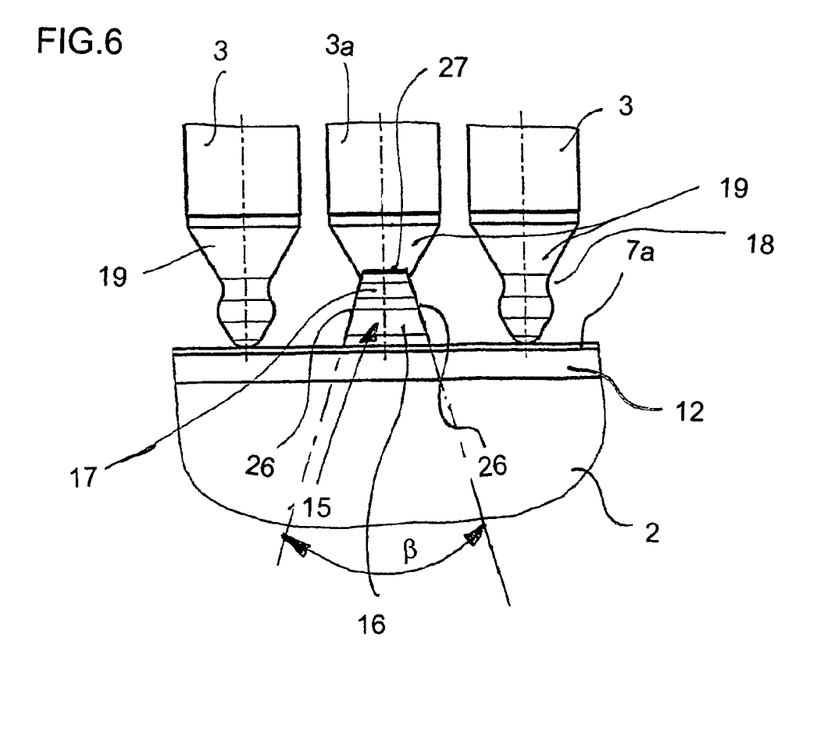
FIG. 6 is a diagrammatic, side view of the detail from a viewing direction rotated through 90° relative to FIG. 5.

Referring now to the figures of the drawing in detail and first, particularly, to FIG. 1 thereof, there is shown a fuel assembly of a boiling water reactor which, as substantial components, contains a fuel assembly head 1, a fuel assembly base 2, a bundle of fuel rods 3 which is disposed between them, a water channel 4 disposed inside the fuel rod bundle and a plurality of spacers 5 which are spaced apart in the axial direction and hold the fuel rods 3 laterally. FIGS. 2 to 6 show a first embodiment for fixing medium-length fuel rods 3a on the fuel assembly base 2. A grid plate 6 shown in FIG. 2 is used for this. It is composed of a plurality of rails 7 extending mutually parallel and forming holding parts, and thereto connecting bars 8 aligned at a right angle, the ends of the rails 7 being integral with the connecting bars 8. The rails 7 are spaced apart uniformly in a longitudinal direction of the connecting bars 8. In the assembled state, the grid plate 6 rests on the upper side of a filter plate 9 closing the fuel assembly base 2. The filter plate 9 contains a multiplicity of preforms 10 made of sheet steel or another suitable material, extending mutually parallel. The preforms 10 are connected to one another by bars 12, extending transversely to their longitudinal extent, arranged on their upper and lower sides (see in particular FIGS. 3 and 7). The rails 7 of the grid plate 6 are disposed with the grid period of the bars 12 of the filter plate 9. In the assembled state, the rails 7 do not therefore protrude into filter openings 13 present in the filter plate 9, rather they extend above the bars 12. The rails 7 and the connecting bars 8 are disposed in a plane, so that the grid plate 6 rests flat on the filter plate 9 in the assembled state. Both the long fuel rods 3 and the medium-length fuel rods 3a are therefore supported not on the bars 12 but on the rails 7. Each rail 7 thus extends in the direction of a fuel rod row 14. A rail 7a, which is assigned to a fuel rod row 14a containing medium-length fuel rods 3a, forms a holding part and has a number of latch assemblies 15 corresponding to the fuel rods 3a. A latch assembly 15 is formed by clips 16 molded at mutually opposing positions laterally on a rail 7a. A grid plate 6 is produced by stamping from a for example 1 mm thick steel sheet. After stamping, the clips 16 extend in the surface plane of the grid plate 6. From this situation, they are bent into their position shown in FIG. 2, in which they extend approximately in the longitudinal or axial direction of the fuel rod 3a. Before this, however, embossing is carried out by which a constriction 17, extending in the longitudinal direction of a rail 7a, is produced in a central length section of the clips 16. As can be seen particularly in FIG. 5, the constrictions 17 engage into an annular waist 18 at a lower end, formed by a plug 19, of a fuel rod 3. The waist 18 is followed upward by a conical region 21. Below the waist 18, the plug 19 has a region 20 radially widening toroidally. This is followed underneath by a conical region 22 with a rounded tip 23. The end sections 24, adjoining the constriction 18 at the top, of the clips 16 extend obliquely to a mid-longitudinal axis 25 of a fuel rod 3a and include an upwardly opening acute angle (FIG. 5). The oblique setting or angle α corresponds approximately to the cone angle of the conical region 21. The side edges 26 of a clip 16 extend obliquely and include a downwardly opening angle β (FIG. 6). An upper edge 27 of the clip 16 extends approximately parallel to the longitudinal direction of a rail 7a. As can be seen from FIGS. 5 and 6, the lower ends of the long fuel rods are configured like those of the medium-length fuel rods 3a. The end of the long fuel rods 3 may, however, be configured differently.

When a fuel rod 3a is being mounted, it is fitted with its plug 19 into the latch assembly 15. The end sections 24 extending obliquely to one another then form an installation funnel. The conical region 22 and the region 20 adjoining it push the clips 16 apart. Once the plug 19 has been fitted fully into the holding assembly 15, the constrictions 17 latch into the waist 18 and fix the fuel rod 3a in the axial direction.

As can be seen from FIG. 2, at a decentralized position of the grid plate 6 there is an opening 28 whose opening edge is formed by bars 29. The bars 29 are shaped and connected to two rails 7a' in such a way as to form an octagonal opening 28. Two short rail sections 11, fitting into the grid period of the other rails and respectively with a bar 29 molded on their mutually opposing ends, extend between the two rails 7a'. In the assembled state a non-illustrated longitudinal section of the water channel 4, which has a circumferential shape formed complementarily with the opening shape, passes through the opening 28. The grid plate 6 is thereby fixed so that it can rotate on the water channel 4. The grid plate 6 is fixed in the axial direction by the non-illustrated longitudinal section of the water channel 4, which passes through the opening 28, undercutting the grid plate in an axially effective fashion. This is achieved by a non-illustrated radial shoulder, on the water channel 4, which protrudes radially beyond the bars 29 and those sections of the rails 7a' which are connected thereto.

Figure 7:
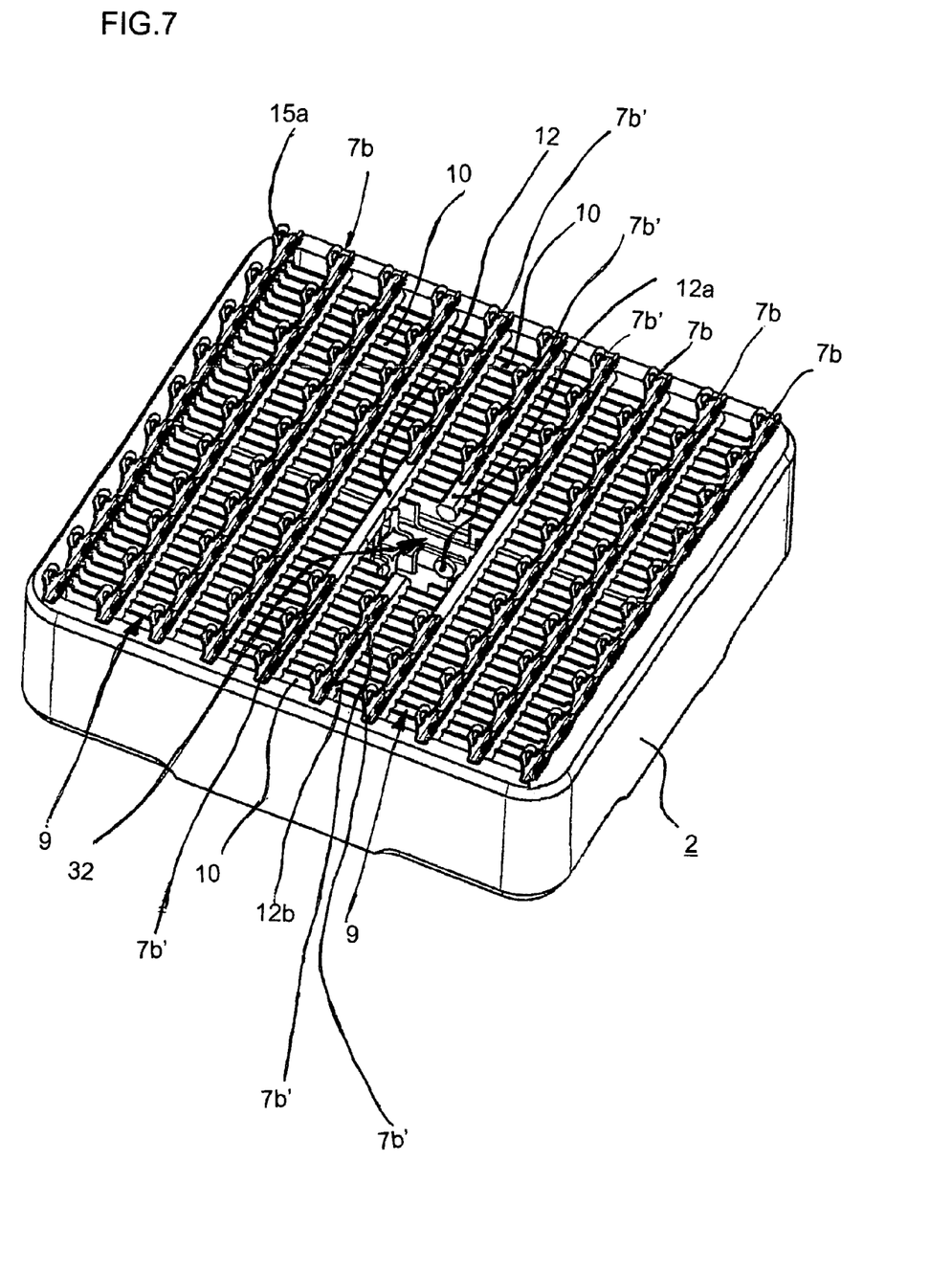
FIG. 7 is a diagrammatic, perspective view of the upper region of the fuel assembly base, having a plurality of rail-shaped holding parts for axially and radially fixing all the fuel rods.
Figure 8:
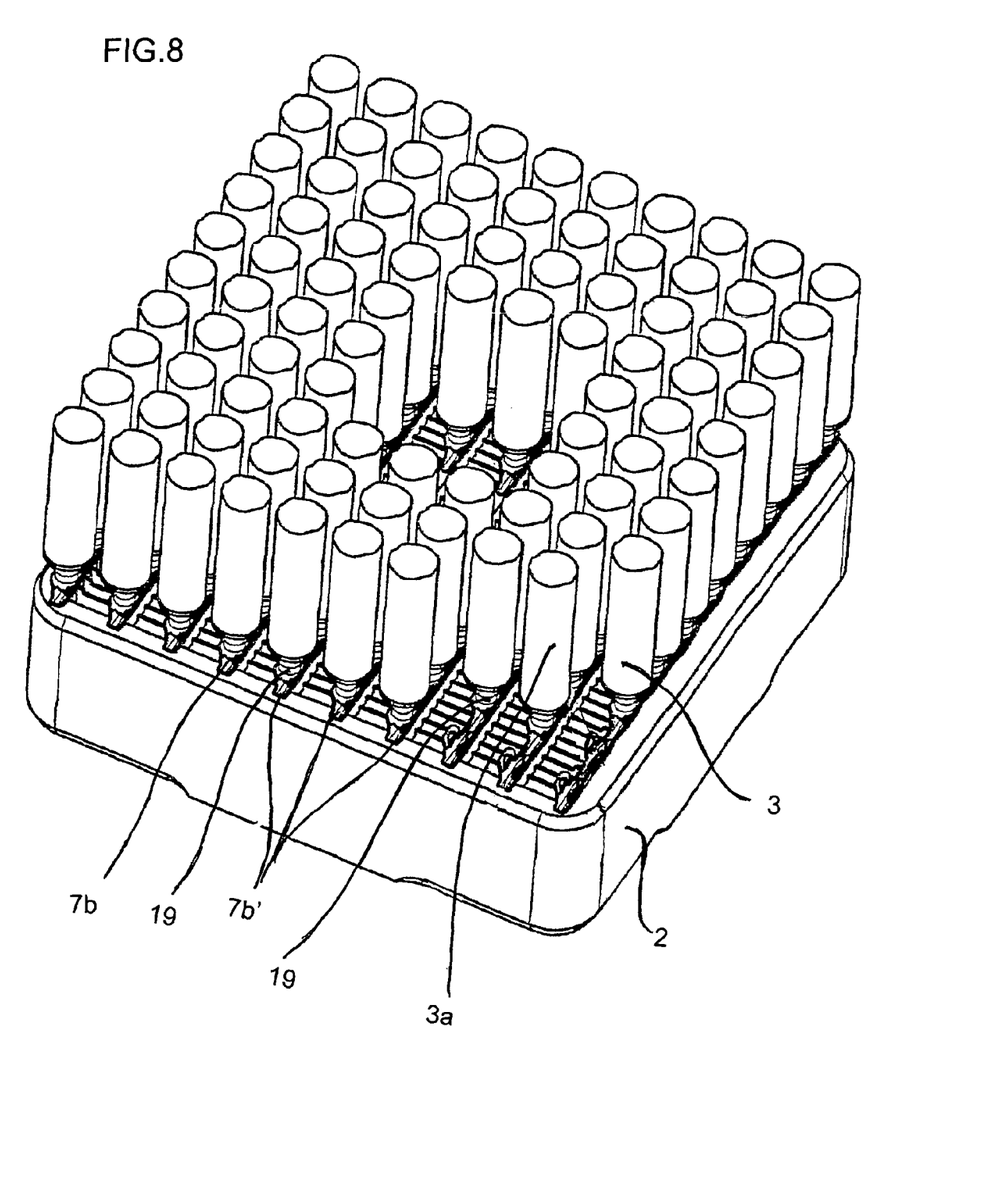
FIG. 8 is a diagrammatic, perspective view of the fuel assembly base of FIG. 7, but with long and medium-length fuel rods positioned thereon.
Figure 9:
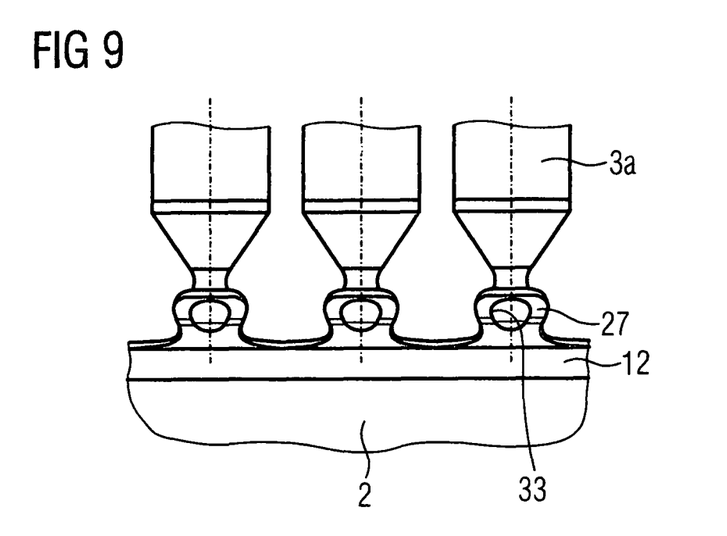
FIG. 9 is a diagrammatic, side view of the fuel assembly base shown in FIG. 8.
Figure 10:
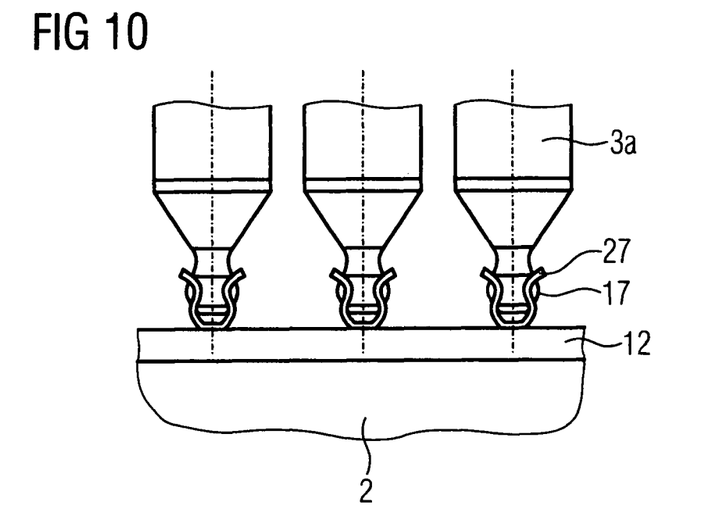
FIG. 10 is a diagrammatic, side view of the fuel assembly base from a viewing direction rotated through 90° relative to FIG. 9.

FIG. 7 represents a second embodiment, which likewise contains a plurality of holding parts configured as rails 7b. The rails 7b are disposed on the bars 12 of the filter plate 9 and are welded in the region of their ends onto the filter plate 9, or the fuel assembly base 2. In the region of a recess 32 used for fixing the water channel 4, two short rails 7b' between whose mutually opposing ends there is a section which is at least as large as the internal width of the recess 32, are assigned to a bar 12 present there and formed of two subsections 12a, 12b, or to a fuel rod row 14. A difference from the exemplary embodiment described above is that each rail 7b carries as many latch assemblies 15a as there are fuel rods 3, 3a in a fuel rod row 14. The latch assemblies 15a are configured so that they also fix a fuel rod 3, 3a in a direction extending in the longitudinal direction of a rail 7b. To this end, they have an approximately circular recess 33 in the region of their constriction 17. The toroidally widened region 20, the surface of which may for example also be configured as part of a spherical surface, engages into the recesses 33 of the clips 16 of a latch assembly 15a. It is also conceivable for the clips 16 to have a bulge (not shown) receiving the region 20. All the fuel rods 3, 3a are thus fixed on the fuel assembly base 2 in any radial directions. The fuel rods 3, 3a' in the lower region of the fuel rod bundle are thereby fixed laterally so that the bottom spacer 5a (FIG. 1) may be obviated. It is also conceivable for the grid plate 6 according to FIG. 2 to be equipped with a number of latch assemblies 15 and/or 15a corresponding to the number of fuel rods 3, 3a of a fuel assembly.

Figure 11:
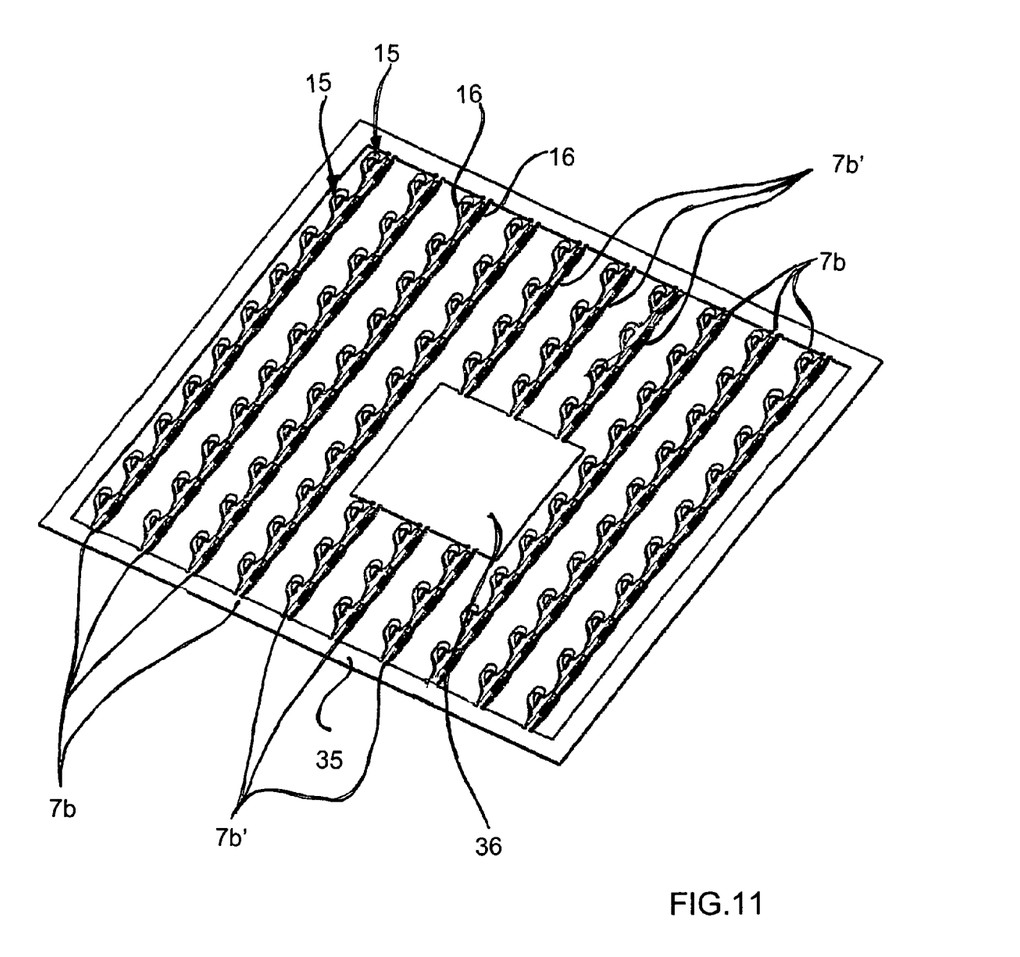
FIG. 11 is a diagrammatic, perspective view of an assembly frame with rail-shaped holding parts fixed thereon.
Figure 12:
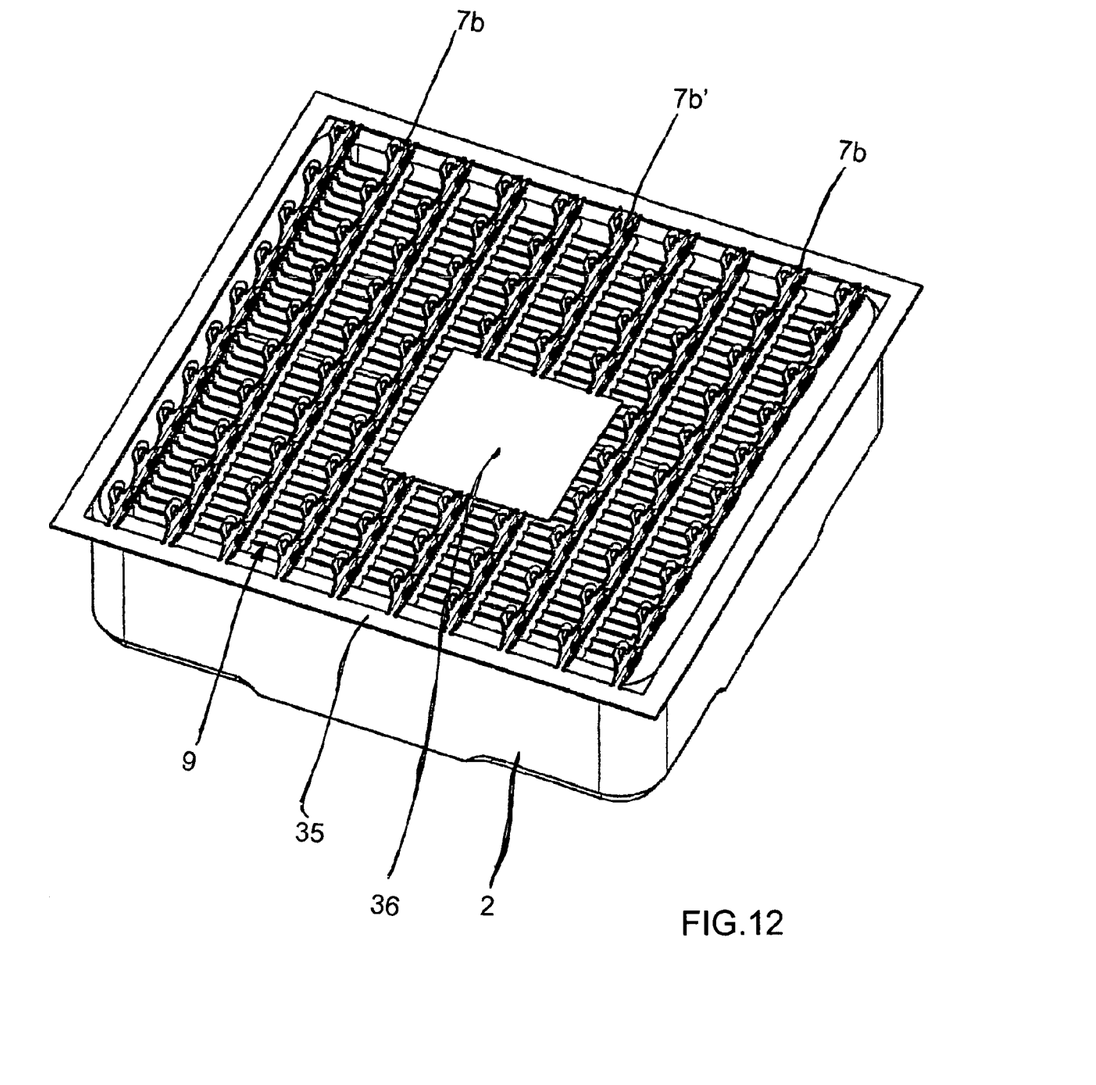
FIG. 12 is a diagrammatic, perspective view of the upper region of the fuel assembly base with the grid plate placed thereon, which has an assembly frame.

In order to facilitate mounting of the rails 7b on the filter plate 9, they are molded onto a frame 35 which has an outer contour corresponding to the circumferential surfaces of the filter plate 9. The short rails 7b' are molded with their inner end on a plate 36. A structure formed of rails 7b, 7b' and the frame 35 may, like the alternative embodiment of FIG. 2, be stamped from a for example 1 mm thick sheet steel preform, in which case as well the clips 16 are bent out of the surface plane of the original sheet metal preform into their position shown in FIG. 11. The auxiliary construction thereby obtained is put onto a filter plate 9 and then the individual rails 7b, 7b' are welded at suitable positions, for example at their ends, to the filter plate 9 or the fuel assembly base 2. The plate 36 and the frame 35 are subsequently separated.

The invention claimed is:

1. A fuel assembly for a boiling water reactor, the fuel assembly comprising:
   a filter plate having an upper side;
   a fuel assembly base having an upper side with a top and closed at said top by said filter plate disposed above said fuel assembly base;
   a separate holding part fastened to said filter plate on said upper side of said filter plate and thereby connected to said upper side of said fuel assembly base, said separate holding part including a plurality of latch assemblies projecting away from said filter plate;
   a fuel assembly head;
   a bundle of fuel rods, including long fuel rods and medium-length fuel rods, extending away from said fuel assembly base and disposed between said fuel assembly base and said fuel assembly head, a plurality of said medium-length fuel rods each being fixed axially on a respective one of said latch assemblies, each of said plurality of said medium-length fuel rods being held entirely above said filter plate by said respective latching assembly; and
   a water channel disposed inside of said bundle of fuel rods.

2. The fuel assembly according to claim 1, wherein said separate holding part also supports thereon said long fuel rods.

3. The fuel assembly according to claim 1, wherein at least some of said long fuel rods are fixed at least radially on said separate holding part.

4. The fuel assembly according to in claim 3, wherein at least some of said medium-length fuel rods are fixed radially on said separate holding part.

5. The fuel assembly according to claim 1, wherein said fuel rods are fixed on said separate holding part with an aid of a snap connection with an axial assembly direction.

6. The fuel assembly according to claim 5,
   wherein said medium length fuel rods have a lower end with a waist behind which said latch assembly disposed on said separate holding part engages in an axially effective fashion.

7. The fuel assembly according to claim 6, wherein each of said latch assemblies has two clip assemblies, molded onto said separate holding part, with flat sides facing one another and each having a precurved region, each of said flat sides of said clip assemblies engages resiliently into said waist with said precurved region.

8. The fuel assembly according to claim 7, wherein:
   said clip assemblies have recesses formed therein; and
   said lower end of said medium length fuel rods have two projections protruding laterally at diametrically opposing positions, each of said two projections engaging in said recesses of said clip assemblies.

9. The fuel assembly according to claim 1, wherein:
   said filter plate has filter openings formed therein; and
   said separate holding part is one of a plurality of holding parts, said holding parts are disposed on said filter plate such that said filter openings remain substantially unblocked.

10. A fuel assembly for a boiling water reactor, the fuel assembly comprising:
    a filter plate having bars extending mutually parallel;
    a fuel assembly base having an upper side with a top and closed at said top by said filter plate disposed above said fuel assembly base
    a separate holding part connected to said upper side of said fuel assembly base, said holding part being rails disposed mutually parallel and with a grid period of said bars of said filter plate, said separate holding part including a plurality of latch assemblies projecting away from said filter plate;
    a fuel assembly head;

a bundle of fuel rods, including long fuel rods and medium-length fuel rods, extending away from said fuel assembly base and disposed between said fuel assembly base and said fuel assembly head, a plurality of said medium-length fuel rods each being fixed axially on a respective one of said latch assemblies, each of said plurality of said medium-length fuel rods being held entirely above said filter plate by said respective latching assembly; and a water channel disposed inside of said bundle of fuel rods.

11. The fuel assembly according to claim 10, further comprising a grid plate having connecting bars, said rails are components of said grid plate, and said rails having ends molded onto said connecting bars aligned transversely to said rails.

12. The fuel assembly according to claim 11, wherein said grid plate has a grid opening formed therein defined by an opening edge, through said grid opening said water channel passes, and behind said opening edge said water channel engages in an axially effective fashion.

13. The fuel assembly according to claim 12, wherein said grid plate is rotationally fixed on said water channel.

14. The fuel assembly according to claim 13, wherein said water channel passes through said grid opening with a form fit that is effective in a rotational direction.

15. The fuel assembly according to claim 1, wherein said holding part is a sheet metal grid plate.

16. The fuel assembly according to claim 10, wherein said holding part is a sheet metal grid plate.

* * * * *